United States Patent
Lu et al.

(10) Patent No.: US 10,483,971 B1
(45) Date of Patent: Nov. 19, 2019

(54) PHYSICAL UNCLONABLE DEVICE AND METHOD OF MAXIMIZING EXISTING PROCESS VARIATION FOR A PHYSICALLY UNCLONABLE DEVICE

(71) Applicant: Taiwan Semiconductor Manufacturing Co., Ltd., Hsinchu (TW)

(72) Inventors: Shih-Lien Linus Lu, Hsinchu (TW); Cormac Michael O'Connell, Ontario (CA); Kun-Hsi Li, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 15/980,767

(22) Filed: May 16, 2018

(51) Int. Cl.
| | |
|---|---|
| *H03K 19/00* | (2006.01) |
| *H03K 19/003* | (2006.01) |
| *G06F 17/50* | (2006.01) |
| *G11C 11/419* | (2006.01) |
| *H01L 23/00* | (2006.01) |
| *H01L 21/324* | (2006.01) |
| *H01L 27/11* | (2006.01) |

(52) U.S. Cl.
CPC ... *H03K 19/00315* (2013.01); *G06F 17/5022* (2013.01); *G06F 17/5081* (2013.01); *G11C 11/419* (2013.01); *H01L 21/324* (2013.01); *H01L 23/576* (2013.01); *H01L 27/1104* (2013.01)

(58) Field of Classification Search
None
See application file for complete search history.

(56) References Cited

U.S. PATENT DOCUMENTS

| | | | | |
|---|---|---|---|---|
| 9,762,400 | B2 * | 9/2017 | Mathew | H04L 9/3278 |
| 2013/0322617 | A1 * | 12/2013 | Orshansky | H04L 9/3278 380/28 |
| 2014/0035670 | A1 * | 2/2014 | Chi | G09C 1/00 330/253 |
| 2016/0182045 | A1 * | 6/2016 | Mai | G09C 1/00 326/8 |
| 2017/0373015 | A1 * | 12/2017 | Yano | G05B 19/128 |

* cited by examiner

*Primary Examiner* — Anh Q Tran
(74) *Attorney, Agent, or Firm* — JCIPRNET

(57) ABSTRACT

A physically unclonable function (PUF) device and a method for maximizing existing process variation for a physically unclonable device are provided. The method of maximizing process variation of the PUF device includes: modeling a physically unclonable function (PUF) device, comprising a plurality of PUF cells, selecting the size of transistors in the PUF device to be smaller than a predetermined size defined according to a design rule check (DRC) and generate maximum variations among the plurality of PUF cells, varying the material of the PUF device, and driving the PUF device with a predetermined voltage. The physically unclonable device includes: a plurality of PUF cells, configured to generate an output. Each of the plurality of PUF cells includes a harvester circuit, configured to generate a bit line and a complementary bit line. The harvester circuit is selected to be smaller than a predetermined size defined according to a design rule check (DRC) and generate maximum variations among the plurality of PUF cells; and a sense amplifier having a plurality of transistors configured to receive a first input signal and a second input signal from the harvester circuit.

11 Claims, 7 Drawing Sheets

PHYSICAL UNCLONABLE DEVICE AND METHOD OF MAXIMIZING EXISTING PROCESS VARIATION FOR A PHYSICALLY UNCLONABLE DEVICE

BACKGROUND

Typically, in the field of semiconductor manufacturing, even if there are two identical integrated circuits on the same die, each integrated circuit would still be unique because of physical randomness even though the two integrated circuits are manufactured using the same manufacturing process and the same material. This inherent variation may be extracted and used as unique identifications and can be thought of as being similar to DNAs of human beings. The physically unclonable function (PUF) has been proposed and became popular to provide security and uniqueness to integrated circuits. A PUF is based on a cryptography which is easy to evaluate and would produce an output, but such output could be hard to predict. Each PUF circuit may provide a unique identity and a unclonable function based on static variations in the components that are used to manufacture the device, and such variations are rarely the same for two electrical components such that the variations would be used to provide a unique identity to each PUF circuit.

In a delay based PUF device, the identity of the device could be generated based on the delay chains of logic which is less secure, and it could be difficult to distinguish among devices by using the variations of the delay chains. A Static Random-access memory (SRAM) PUFs may generate such variations during a startup stage, but to do so may cause time delays during power on or power off. Also, using additional circuits may increase power consumption, may require extra bits, and may require a filtering mechanics to identify the bits that could be masked.

In addition, because PUF devices are inherent as technologies continue to develop even though foundries have kept attempting to control the variations of the core devices, it could be desirable to actually develop a PUF device that has a maximum static variation for certain applications in this technical field.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
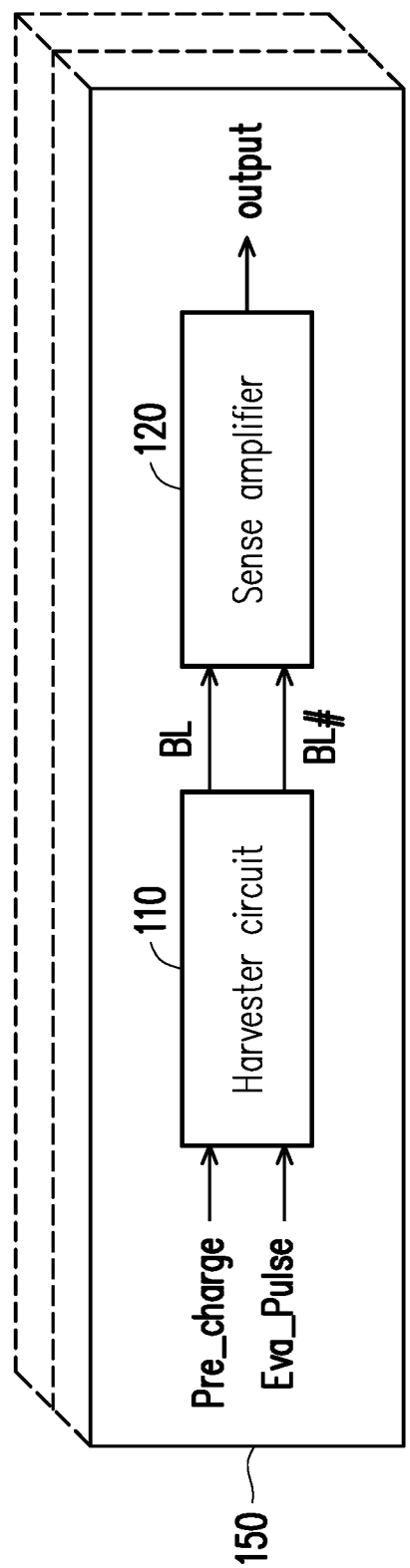
FIG. 1 illustrates a schematic block diagram of a physically unclonable function (PUF) device according to an exemplary embodiment of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a schematic block diagram of a physically unclonable function (PUF) device according to an exemplary embodiment of the disclosure. Referring to FIG. 1, a physically unclonable device 100 includes a plurality of PUF cells 150. Each of the plurality of PUF cells includes a harvester circuit 110, a sense amplifier 120. The harvester circuit configured to receive a pre-charge signal (Pre_charge) and a pulse evaluation signal (Eva_Pulse) to generate a difference in the variation of the harvester circuit coupled to the sense amplifier 120. The sense amplifier evaluates the difference of the variation generated by the harvester circuit and latches the output.

Figure 2:
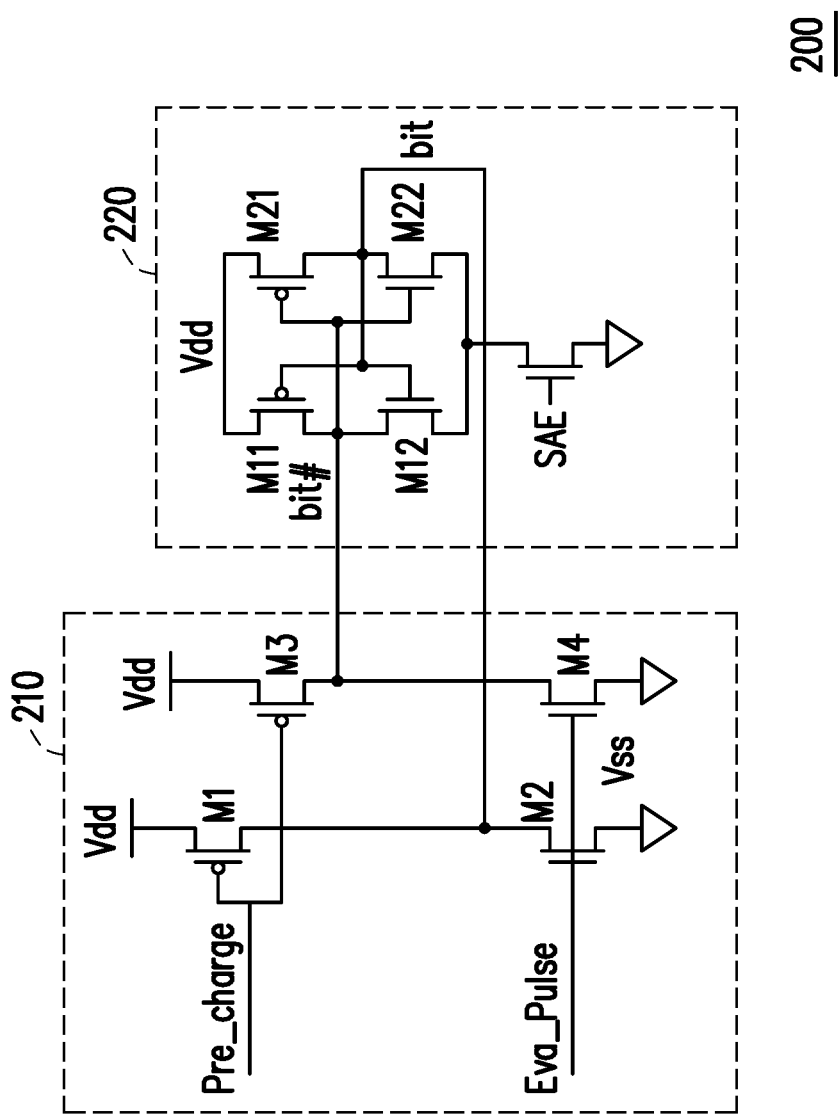
FIG. 2 illustrates a schematic diagram of a physically unclonable function (PUF) device according to an exemplary embodiment of the disclosure.

FIG. 2 illustrates a detailed schematic diagram of a physically unclonable function (PUF) device 200 having a plurality of PUF cells, each of the plurality of PUF cells includes a harvester circuit 210 and a sense amplifier 220. The harvester circuit 210 includes a first circuit and a second circuit configured to generate a bit line and a complementary bit line. The first circuit first having a first pair of transistors M1 and M2 receives a pre-charge signal at a control terminal, since a pre-charge circuit is well-know, the detailed description of the pre-charge circuit to generate the pre-charge signal is omitted herein. The second circuit having a second pair of transistors M3 and M4 receives a pulse evaluation signal at a control terminal to provide maximum variation to the harvester circuit 210. The first circuit is configured to generate the complementary bit line (BL#) with a first predetermined time (t1). Similarly, the second circuit is configured to generate the bit line (BL) with a second predetermined time (t2=t1+Δt) where Δt is a delay time programmable by a pulse evaluation circuit.

The first pair transistors M1 and M2 and second pair transistors M3 and M4 are chosen to be input/output (I/O) devices instead of the conventional complementary metal oxide semiconductor (CMOS) transistors. The first pair and second pair IO devices and are selected to be minimum size, where the size of transistors is defined in (W/L=width to length ratio) which is smaller than a predetermined size (for e.g., the size deteiniined by the lithography rules) to violate the design rule check (DRC) to generate the maximum variations in the plurality of PUF cells in the PUF device.

Figure 3:
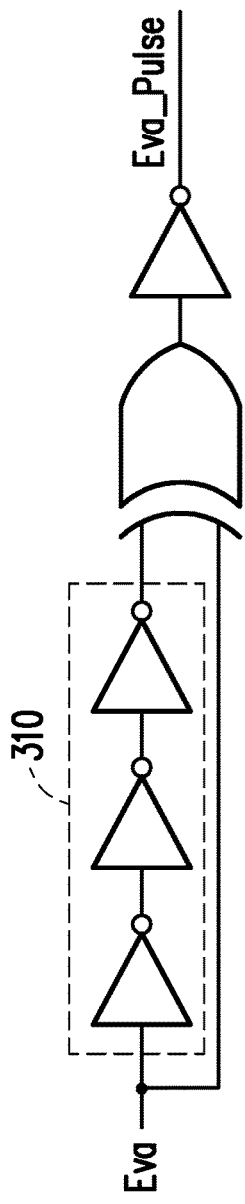
FIG. 3 illustrates a schematic diagram of pulse evaluation circuit in a physically unclonable function (PUF) device according to an exemplary embodiment of the disclosure.

FIG. 3 illustrates a detailed schematic diagram of a pulse evaluation circuit 300 in a physically unclonable function (PUF) device according to an exemplary embodiment of the disclosure. The pulse evaluation circuit having an inverter chain propagation delay circuit 310 and a logic circuits to generate a pulse evaluation signal. The inverter chain propagation delay circuit 310 having N number of inverter circuits, where N is chosen to be odd number of inverter circuit (for e.g., N=1, 3, 5, 7 . . . ). The logic circuit includes a EXOR gate and an inverter gate coupled to the inverter chain propagation delay circuit 310. In some other embodiments the logic circuit includes different combination of logic gates (e.g., AND, OR, NOT, EXOR, EXNOR, Flip flops, etc.) to implement the pulse evaluation circuit. Hence the logic circuits in this disclosure is not limited thereto. The pulse evaluation circuit 310 receives the evaluation signal, is programmable to and generate the pulse evaluation signal with different pulse width. The width of the pulse is controlled and programmable by the logic circuits and by choosing N in the inverter propagation delay circuit 310.

Figure 4:
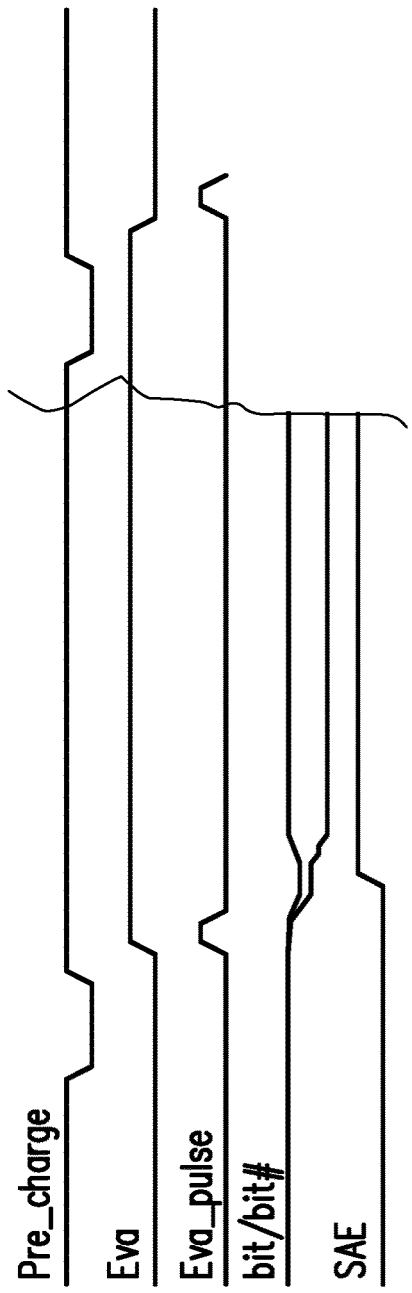
FIG. 4 illustrates an operation waveform of a physically unclonable function (PUF) device according to an exemplary embodiment of the disclosure.

FIG. 4 illustrates an operation waveform of a physically unclonable function (PUF) device according to another exemplary embodiment of the disclosure. As shown in FIG. 2, the first pair receives the pre-charge signal (Pre_charge) with the first predetermined time (t1) and the second pair receives the evaluation signal, Eva with the second predetermined time (t2=t1+Δt). After the predetenniined delay programmable by the pulse evaluation circuit, the pulse evaluation signal (Eva_Pulse) is triggered. The pulse width signal generated by the pulse evaluation circuit is to generate the difference between the BL and the BL#. However, the difference between BL and the BL# is not too long as the BL and BL# are discharged to ground completely. Hence, the difference between the BL and BL# is the designer choice and flexible in this disclosure. The sense amplifier has an enable signal, SAE to trigger the amplification operation. After the evaluation of the difference in the BL and BL#, the sense amplifier eventually enabled to obtain the stable "1" and "0" or "0" or "1" for the BL and BL#. At once, the BL and BL# reach the stable binary value (bit value="0" or "1"), the sense amplifier generates the latched output result.

Figure 5:
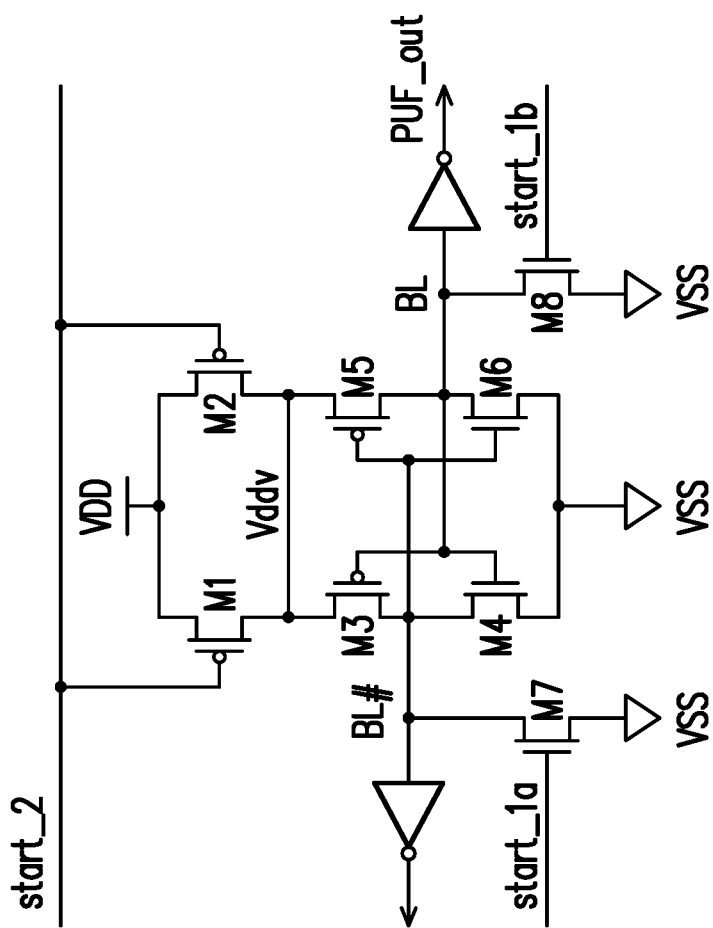
FIG. 5 illustrates a schematic diagram of a physically unclonable function (PUF) device according to an exemplary embodiment of the disclosure.

FIG. 5 illustrates a detailed schematic diagram of a physically unclonable function (PUF) device 500, having a plurality of PUF cells configured to generate output result. Each of the plurality of PUF cells includes an enable/disable complementary metal oxide semiconductor (CMOS) differential logic circuit (ECDL). The ECDL circuit having a first transistor M1, a second transistor M2 and a sense amplifier. The first terminal of M1 and M2 are coupled to the predetermined voltage, power supply VDD and the second terminal of M1 and M2 are coupled to the sense amplifier. The enable signal, start_2 is couple to the control terminal of the transistor M1 and M2.

The sense amplifier includes a first pair and second pair. The first pair having a third transistor M3 and a fourth transistor M4. Similarly, the second pair having a fifth transistor M5 and a sixth transistor M6. Both the first pair and second pair form an inverter circuit. The control terminal of the first pair receives a BL and an output node of first pair receives a BL#. Consequently, the control terminal of the second pair receives the BL# and the output node of second pair receives the BL. The first pair is triggered by the enable signal, start_1a through the seventh transistor M7. Similarly, the second pair is triggered by the enable signal, start_1b through the eighth transistor M8. The transistors M3 and M5 are selected as IO device. The IO devices and are selected to be minimum size, which is smaller than a predetermined size to violate the DRC to generate the maximum variations in the plurality of PUF cells in the PUF device.

Figure 6:
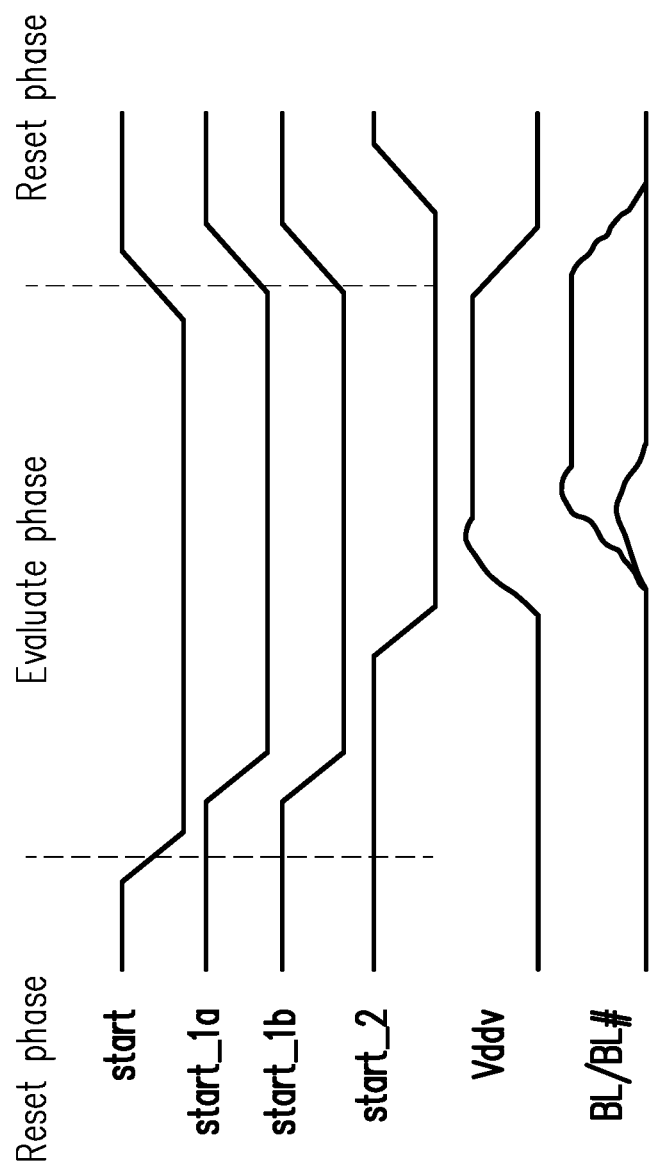
FIG. 6 illustrates an operation waveform of a physically unclonable function (PUF) device according to an exemplary embodiment of the disclosure.

FIG. 6 illustrates an operation waveform of a physically unclonable function (PUF) device according to another exemplary embodiment of the disclosure. As shown in FIG. 5 the PUF device includes three phases, a reset phase, an evaluate phase and a reset phase. After the reset phase the control terminal of first pair receives the BL, and the output node of a first pair receives the BL# through the seventh transistor M7 which is enabled by the enable signal, start_1a. Consequently, the control terminal of the second pair receives the BL#, and the output node of the second pair receives the BL through the eighth transistor M8 which is enable by the enable signal, start_1b. During the evaluate phase, the sense amplifier is enable by the transistors M1 and M2 enable receives the enable signal start_2. The second terminal coupled to the sense amplifier is triggered to the second predetermined voltage Vddv. After the evaluation of the difference in the BL and BL#, the sense amplifier eventually enabled to obtain the stable "1" and "0" or "0" or "1" for the BL and BL#. At once, the BL and BL# reach the stable binary value (bit value="0" or "1"), the sense amplifier generates the latched output result and after the PUF cells is refreshed in reset phase.

Figure 7:
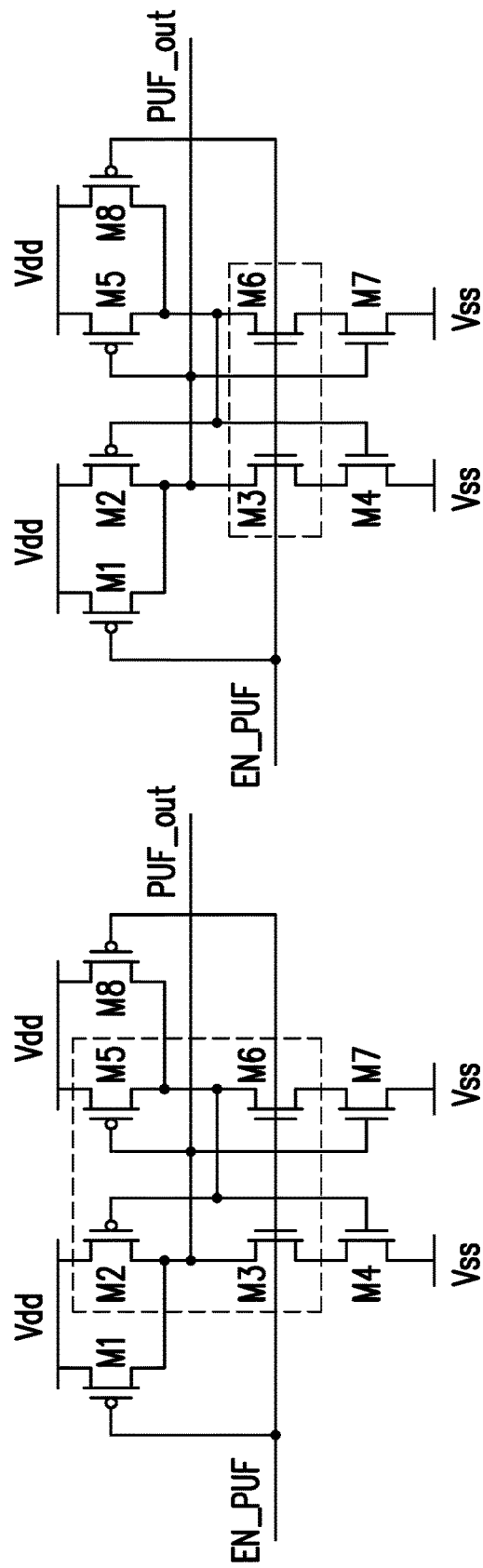
FIG. 7A illustrates a schematic diagram of a physically unclonable function (PUF) device according to an exemplary embodiment of the disclosure.
FIG. 7B illustrates a schematic diagram of a physically unclonable function (PUF) device according to an exemplary embodiment of the disclosure.

FIG. 7A illustrates an a physically unclonable function (PUF) device according to another exemplary embodiment of the disclosure. The PUF device having a plurality of PUF cell, each of the plurality of PUF cell having two NAND gates, a first circuit and a second circuit connected to form SR latch. The first circuit having CMOS transistors, transistor M1 and M2 is a PMOS coupled to the high side, predetermined voltage VDD and transistors M3 and M4 is a NMOS transistor coupled to the low side, ground voltage. Similarly, the second circuit CMOS transistors, transistor M5 and M6 is a PMOS coupled to the high side, predetermined voltage VDD and transistors M7 and M8 is a NMOS transistor coupled to the low side, ground voltage. The first input, EN_PUF of the PUF cells receive at a control terminal of the M1, M3, M6 and M7. The second input of the PUF cell is cross coupled. The transistors M2, M3, M5 and M7 are selected to be IO devices instead of conventional transistors. The IO devices and are selected to be minimum size, which is smaller than a predetermined size to violate the DRC to generate the maximum variations in the plurality of PUF cells in the PUF device.

FIG. 7B illustrates a physically unclonable function (PUF) device according to another exemplary embodiment of the disclosure. The PUF device having a plurality of PUF cell, each of the plurality of PUF cell having two NAND gates, a first circuit and a second circuit connected to form SR latch. The first circuit having CMOS transistors, transistor M1 and M2 is a PMOS coupled to the high side, predetermined voltage VDD and transistors M3 and M4 is a NMOS transistor coupled to the low side, ground voltage. Similarly, the second circuit CMOS transistors, transistor M5 and M6 is a PMOS coupled to the high side, predetermined voltage VDD and transistors M7 and M8 is a NMOS transistor coupled to the low side, ground voltage. The first input, EN_PUF of the PUF cells receive at a control terminal of the M1, M3, M6 and M7. The second input of the PUF cell is cross coupled. The transistors M3 and M7 are IO devices instead of conventional transistors. The IO devices and are selected to be minimum size, which is smaller than a predetermined size to violate the DRC to generate the maximum variations in the plurality of PUF cells in the PUF device.

Figure 8:
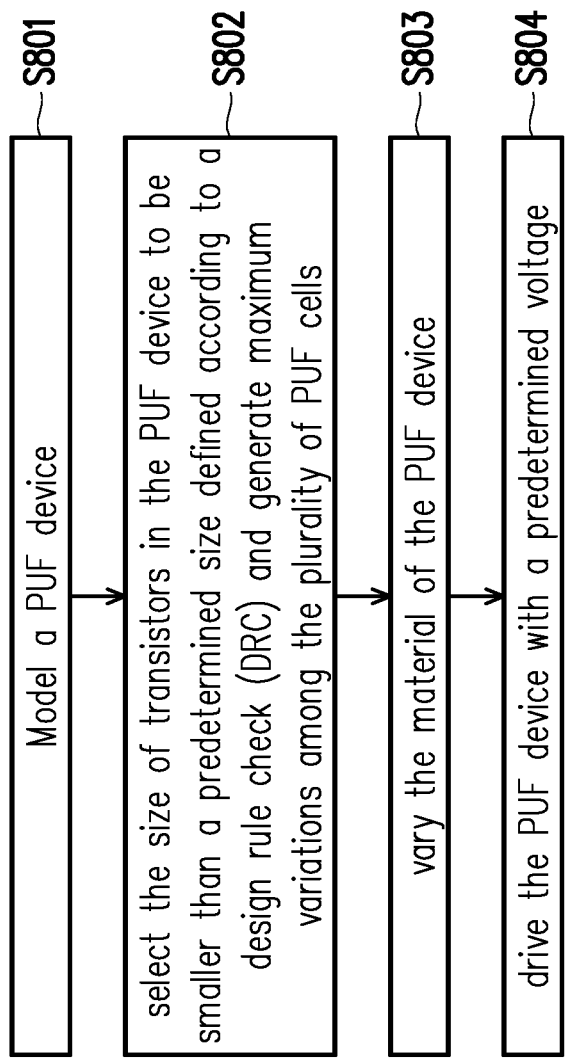
FIG. 8 is a flowchart to illustrate the method for maximizing existing process variation for a physically unclonable device.

FIG. 8 is the flowchart to illustrate the method for maximizing existing process variation for a physically unclonable device includes modeling a physically unclonable function (PUF) circuit having a harvester circuit and a sense amplifier in step S801. In step S802, selecting the size of the transistors in the harvester circuit to be smaller than a predetermined size to violate DRC and generate the maximum variations in the different PUF cells on the same chip. In step S803, varying the material of the transistors, which is achieved by enhancing the doping concentration of the device results in increasing a threshold voltage of the device. The lithographic and fabrication steps of the IO device having maximum variation in a standard foundry CMOS process. The varying material property of device also includes, deposition and annealing, which results in increasing the grain structure and the size of the device thereby increase the thickness and width of the device. The increase of thickness eventually increases the resistance of the device. The operation of the method of maximizing variation in the PUF circuit is similar to PUF device in FIG. 2, hence the detailed description of the operation of the PUF circuit is omitted herein. In step S804, drive the harvester circuit with the predetermined voltage.

According to some embodiments of the disclosure by referring to FIG. 2, FIG. 3, and FIG. 4 a physically unclonable device 100 includes a plurality of PUF cells 150. Each of the plurality of PUF cells includes a harvester circuit 110, a sense amplifier 120. The harvester circuit configured to receive a pre-charge signal (Pre_charge) and a pulse evaluation signal, (Eva_Pulse) to generate a difference in the variation of the harvester circuit coupled to the sense amplifier 120, a physically unclonable function (PUF) device is introduced. The PUF device may include plurality of PUF cells, configured to generate an output voltage. The pulse evaluation circuit having an inverter chain propagation delay circuit 310 and a logic circuits to generate a pulse evaluation signal. The inverter chain propagation delay circuit 310 having N number of inverter circuits, where N is chosen to be odd number of inverter circuit (for e.g., N=1, 3, 5, 7 . . . ). The logic circuit includes a EXOR gate and an inverter gate coupled to the inverter chain propagation delay circuit 310. In some other embodiments the logic circuits include different combinations of logic gates (for e.g., AND, OR, NOT, EXOR, EXNOR flip flops, etc.) to implement the pulse evaluation circuit. Hence the logic circuits in this disclosure is not limited thereto. The pulse evaluation circuit 310 receives the evaluation signal, is programmable to and generate the pulse evaluation signal with different pulse width. The width of the pulse is controlled and programmable by the logic circuits and by choosing N in the inverter propagation delay circuit 310.

The each of the plurality of PUF cells may further include, a harvester circuit, having a first circuit and a second circuit configured to generate a bit line and a complementary bit line. The first circuit and the second circuit are selected to be smaller than a predetermined size to violate DRC and generate the maximum variations in the different PUF cells on the same chip. The PUF cells further includes a sense amplifier, having a plurality of transistors configured to receive the first input signal line and second input signal line for receiving a first input signal and second input signal from the harvester circuit.

The first pair receives the pre-charge signal (Pre_charge) with the first predetermined time (t1) and the second pair receives the evaluation signal, Eva with the second predetermined time (t2=t1+Δt). After the predetermined delay programmable by the pulse evaluation circuit, the pulse evaluation signal, Eva_Pulse is triggered. The pulse width signal generated by the pulse evaluation circuit is to generate the difference between the BL and the BL#. However, the difference between BL and the BL# is not too long as the BL and BL# are discharged to ground completely. Hence, the difference between the BL and BL# is the designer choice and flexible in this disclosure. The sense amplifier has an enable signal, SAE to trigger the amplification operation. After the evaluation of the difference in the BL and BL#, the sense amplifier eventually enabled to obtain the stable "1" and "0" or "0" or "1" for the BL and BL#. At once, the BL and BL# reach the stable binary value (bit value="0" or "1"), the sense amplifier generates the latched output result.

According to some embodiments of the disclosure by referring to FIG. 3, FIG. 5 and FIG. 6 a physically unclonable function (PUF) device 500, having a plurality of PUF cells configured to generate output result. Each of the plurality of PUF cells includes an enable/disable complementary metal oxide semiconductor (CMOS) differential logic circuit (ECDL). The ECDL circuit having a first transistor M1, a second transistor M2 and a sense amplifier. The first terminal of M1 and M2 are coupled to the predetermined voltage, power supply VDD and the second terminal of M1 and M2 are coupled to the sense amplifier. The enable signal, start_2 is couple to the control terminal of the transistor M1 and M2. The sense amplifier includes a first pair and second pair. The first pair having a third transistor M3 and a fourth transistor M4. Similarly, the second pair having a fifth transistor M5 and a sixth transistor M6. Both the first pair and second pair forms an inverter circuit. The control terminal of the first pair receives a BL and an output node of first pair receives a BL#. Consequently, the control terminal of the second pair receives the BL# and the output node of second pair receives the BL. The first pair is triggered by the enable signal, start_1a through the seventh transistor M7. Similarly, the second pair is triggered by the enable signal, start_1b through the eighth transistor M8. The transistors M3 and M5 are selected as IO device. The IO devices and are selected to be minimum size, which is smaller than a predetermined size to violate the DRC to generate the maximum variations in the plurality of PUF cells in the PUF device. The sense amplifier evaluates the difference of the variation generated by the harvester circuit and latches the output. The PUF device may include plurality of PUF cells, configured to generate an output voltage. The PUF cells further includes an enable/disable complementary metal oxide semiconductor (CMOS) differential logic circuit (ECDL), having a first transistor, a second transistor, a sense amplifier. The sense amplifier comprises a first pair, a second pair and a bias transistor. The first pair forms an inverter circuit having a third transistor and a fourth transistor, and the second pair forms an inverter circuit having a fifth transistor and a sixth transistor. The third transistor and the fifth transistor are IO devices, use predetermined voltage to powering the PUF cells. The IO devices are selected to be smaller than a predetermined size to violate design rule check (DRC) and generate the maximum variations in the different PUF cells on the same chip. The PUF device further includes a pulse evaluation circuit having an inverter chain propagation delay circuit 310 and a logic circuits to generate a pulse evaluation signal. The inverter chain propagation delay circuit 310 having N number of inverter circuits, where N is chosen to be odd number of inverter circuit (for e.g., N=1, 3, 5, 7 . . . ). The logic circuit includes a EXOR gate and an inverter gate coupled to the inverter chain propagation delay circuit 310. In some other embodiments the logic circuits includes different combination of logic gates (for e.g., AND, OR, NOT, EXOR, EXNOR flip flops, etc.) to implement the pulse evaluation circuit. Hence the logic circuits in this disclosure is not limited thereto. The pulse evaluation circuit 310 receives the evaluation signal, is programmable to and generate the pulse evaluation signal with different pulse width. The width of the pulse is controlled and programmable by the logic circuits and by choosing N in the inverter propagation delay circuit 310.

The PUF device includes three phases, a reset phase, an evaluate phase and a reset phase. After the reset phase the control terminal of first pair receives the BL, and the output node of a first pair receives the BL# through the seventh transistor M7 which is enabled by the enable signal, start_1a. Consequently, the control terminal of the second pair receives the BL#, and the output node of the second pair receives the BL through the eighth transistor M8 which is enable by the enable signal, start_1b. During the evaluate phase, the sense amplifier is enable by the transistors M1 and M2 enable receives the enable signal start_2. The second terminal coupled to the sense amplifier is triggered to the second predetermined voltage Vddv. After the evaluation of the difference in the BL and BL#, the sense amplifier eventually enabled to obtain the stable "1" and "0" or "0" or "1" for the BL and BL#. At once, the BL and BL# reach the stable binary value (bit value="0" or "1"), the sense amplifier generates the latched output result and after the PUF cells is refreshed in reset phase.

According to some embodiments of the disclosure by referring FIG. 8 flowchart to illustrate the method for maximizing existing process variation for a physically unclonable device includes modeling a physically unclonable function (PUF) circuit having a harvester circuit and a sense amplifier in step S801. In step S802, selecting the size of the transistors in the harvester circuit to be smaller than a predetermined size to violate DRC and generate the maximum variations in the different PUF cells on the same chip. In step S803, varying the material of the transistors, which is achieved by enhancing the doping concentration of the device results in increasing a threshold voltage of the device. The lithographic and fabrication steps of the IO device having maximum variation in a standard foundry CMOS process. The varying material property of device also includes, deposition and annealing, which results in increasing the grain structure and the size of the device thereby increase the thickness and width of the device. The increase of thickness eventually increases the resistance of the device. In step S804, drive the harvester circuit with the predetermined voltage. The method of maximum variation in PUF device achieved by varying maximum variation difference in the harvester circuit by selecting the IO transistors to be smaller than a predetermined size to violate design check rule (DRC) and generate the maximum variation in the different PUF cells on the same chip. In addition, enhance the doping concentration of the transistors resulting in device having higher threshold voltage of the device. Driving the harvester circuit with standard predetermined voltage, VDD instead of IO VDD.

The variation provides more stable PUF output which is not affected by the process improvement in the technology. By adopting this method, the maximum variation is achieved. The method includes, modeling a physically unclonable function (PUF) circuit. The method further includes, selecting the size of transistors in the harvester circuit to be smaller than a predetermined size to violate design rule check (DRC) and generate the maximum variations in the different PUF cells on the same chip. The method further includes the steps of varying the material of the semiconductor device and driving the harvester circuit with a predetermined voltage.

According to some embodiments of the disclosure by referring to FIG. 7A and FIG. 8, a physically unclonable function (PUF) device and method. The PUF device having a plurality of PUF cell, each of the plurality of PUF cell having two NAND gates, a first circuit and a second circuit connected to fowl SR latch. The first circuit having CMOS transistors, transistor M1 and M2 is a PMOS coupled to the high side, predetermined voltage VDD and transistors M3 and M4 is a NMOS transistor coupled to the low side, ground voltage. Similarly, the second circuit CMOS transistors, transistor M5 and M6 is a PMOS coupled to the high side, predetermined voltage VDD and transistors M7 and M8 is a NMOS transistor coupled to the low side, ground voltage. The first input, EN_PUF of the PUF cells receive at a control terminal of the M1, M3, M6 and M7. The second input of the PUF cell is cross coupled. The transistors M2, M3, M5 and M7 are selected to be IO devices instead of conventional transistors. The IO devices and are selected to be minimum size, which is smaller than a predetermined size to violate the DRC to generate the maximum variations in the plurality of PUF cells in the PUF device. The method for maximizing existing process variation for a physically unclonable device includes modeling a physically unclonable function (PUF) circuit having a harvester circuit and a sense amplifier in step S801. In step S802, selecting the size of the transistors in the harvester circuit to be smaller than a predetermined size to violate DRC and generate the maximum variations in the different PUF cells on the same chip. In step S803, varying the material of the transistors, which is achieved by enhancing the doping concentration of the device results in increasing a threshold voltage of the device. The lithographic and fabrication steps of the IO device having maximum variation in a standard foundry CMOS process. The varying material property of device also includes, deposition and annealing, which results in increasing the grain structure and the size of the device thereby increase the thickness and width of the device. The increase of thickness eventually increases the resistance of the device. In step S804, drive the harvester circuit with the predetermined voltage. The method of maximum variation in PUF device achieved by varying maximum variation difference in the harvester circuit by selecting the IO transistors to be smaller than a predetermined size to violate design check rule (DRC) and generate the maximum variation in the different PUF cells on the same chip. In addition, enhance the doping concentration of the transistors resulting in device having higher threshold voltage of the device. Driving the harvester circuit with standard predetermined voltage, VDD instead of IO VDD.

According to some embodiments of the disclosure by referring to FIG. 7B and FIG. 8, a physically unclonable function (PUF) device and method. The PUF device having a plurality of PUF cell, each of the plurality of PUF cell having two NAND gates, a first circuit and a second circuit connected to form SR latch. The first circuit having CMOS transistors, transistor M1 and M2 is a PMOS coupled to the high side, predetermined voltage VDD and transistors M3 and M4 is a NMOS transistor coupled to the low side, ground voltage. Similarly, the second circuit CMOS transistors, transistor M5 and M6 is a PMOS coupled to the high side, predetermined voltage VDD and transistors M7 and M8 is a NMOS transistor coupled to the low side, ground voltage. The first input, EN_PUF of the PUF cells receive at a control terminal of the M1, M3, M6 and M7. The second input of the PUF cell is cross coupled. The transistors M3 and M7 are IO devices instead of conventional transistors. The IO devices and are selected to be minimum size, which is smaller than a predetermined size to violate the DRC to generate the maximum variations in the plurality of PUF cells in the PUF device. The method for maximizing existing process variation for a physically unclonable device includes modeling a physically unclonable function (PUF) circuit having a harvester circuit and a sense amplifier in step S801. In step S802, selecting the size of the transistors in the harvester circuit to be smaller than a predetermined size to violate DRC and generate the maximum variations in the different PUF cells on the same chip. In step S803, varying the material of the transistors, which is achieved by enhancing the doping concentration of the device results in increasing a threshold voltage of the device. The lithographic and fabrication steps of the IO device having maximum variation in a standard foundry CMOS process. The varying material property of device also includes, deposition and annealing, which results in increasing the grain structure and the size of the device thereby increase the thickness and width of the device. The increase of thickness eventually increases the resistance of the device. In step S804, drive the harvester circuit with the predetermined voltage. The method of maximum variation in PUF device achieved by varying maximum variation difference in the harvester circuit by selecting the IO transistors to be smaller than a predetermined size to violate design check rule (DRC) and generate the maximum variation in the different PUF cells on the same chip. In addition, enhance the doping concentration of the transistors resulting in device having higher threshold voltage of the device. Driving the harvester circuit with standard predetermined voltage, VDD instead of IO VDD.

Accordingly, the disclosure provides a PUF device and a method of maximizing existing process variations of the PUF device.

In an aspect, the disclosure is directed to a PUF device which would include not limited to which includes a plurality of PUF cells, configured to generate an output. Each of the plurality of PUF cells having a harvester circuit and a sense amplifier. The harvester circuit is configured to generate a bit line and a complementary bit line and selected to be smaller than a predetermined size defined according to a design rule check (DRC) and generate maximum variations among the plurality of PUF cells. The sense amplifier having a plurality of transistors configured to receive a first input signal and a second input signal from the harvester circuit.

In an aspect, the disclosure is directed to a PUF device which would include not limited to which includes a plurality of PUF cells, configured to generate an output. Each of the plurality of PUF cells includes an enable/disable complementary metal oxide semiconductor (CMOS) differential logic circuit (ECDL), having a first transistor, a second transistor, and a sense amplifier. The sense amplifier having a first pair, a second pair and a bias transistor. The first pair forms an inverter circuit comprising a third transistor and a fourth transistor, and the second pair forms an inverter circuit comprising a fifth transistor and a sixth transistor. The third transistor and the fifth transistor are IO devices, where the IO devices use a predetermined voltage to power the PUF cells. The IO devices are selected to be smaller than a predetermined size defined according to a design rule check (DRC) and generate maximum variations among the plurality of PUF cells.

In an aspect, the disclosure is directed to a method of maximizing existing process variations of a PUF device, the method would include not limited to: modeling a physically unclonable function (PUF) device, having a plurality of PUF cells. Selecting the size of transistors in the PUF device to be smaller than a predetermined size defined according to a design rule check (DRC) and generate maximum variations among the plurality of PUF cells. Varying the material of the PUF device. Driving the PUF device with a predetermined voltage.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:
1. A physically unclonable function (PUF) device comprising:
 a plurality of PUF cells, configured to generate an output, wherein each of the plurality of PUF cells comprising:
  a harvester circuit comprising a first circuit which comprises a first pair of transistors and a second circuit which comprises a second pair of transistors, the harvester circuit is configured to generate a bit line and a complementary bit line, wherein the harvester circuit is selected to be smaller than a predetermined size defined according to a design rule check (DRC) and generate maximum variations among the plurality of PUF cells,
  a sense amplifier comprising a plurality of transistors configured to receive a first input signal and a second input signal from the harvester circuit; and
  a pulse evaluation circuit, programmable to generate a pulse evaluation signal coupled to a control terminal of the second pair of transistors.
2. The PUF device of claim 1, wherein
 the first circuit further configured to generate the complementary bit line for a first predetermined time, and
 the second circuit further configured to generate the bit line for a second predetermined time.

3. The PUF device of claim 2, further comprising:
a control terminal of the first pair of transistors are coupled to a pre-charge signal, and
the control terminal of the second pair of transistors are coupled to the pulse evaluation signal with a predetermined delay.

4. The PUF device of claim 2, wherein the first pair of transistors and the second pair of transistors are IO devices which generate maximum variations in the harvester circuit.

5. The PUF device of claim 4, wherein the IO devices use a predetermined voltage to power the PUF cells.

6. The PUF device of claim 1, wherein after the pulse evaluation signal is stopped, the sense amplifier is enabled to translate difference between the bit line and the complementary bit line.

7. The PUF device of claim 1, wherein the sense amplifier further comprising a third pair of transistors and a fourth pair of transistors, a control terminal of the third pair of transistors receives a bit signal and an output node of the third pair of transistors receives a complementary bit signal from the harvester circuit, and a control terminal of the fourth pair of transistors receives the complementary bit signal and an output node of the fourth pair of transistors receives the bit signal from the harvester circuit.

8. The PUF device of claim 7, wherein the sense amplifier further comprising:
a bias transistor, coupled to the third pair of transistors and the fourth pair of transistors, to receive an enable signal to turn on the sense amplifier.

9. The PUF device of claim 7, wherein after evaluating difference between the bit line and the complementary bit line, the sense amplifier generates a latched output result when the bit line and the complementary bit line reaches the stable binary value.

10. A physically unclonable function (PUF) device comprising:
a plurality of PUF cells, configured to generate an output, wherein each of the plurality of PUF cells comprising:
an enable/disable complementary metal oxide semiconductor (CMOS) differential logic circuit (ECDL), comprising a first transistor, a second transistor, and a sense amplifier, wherein the sense amplifier comprising a first pair, a second pair and a bias transistor,
the first pair forms an inverter circuit comprising a third transistor and a fourth transistor, and the second pair forms an inverter circuit comprising a fifth transistor and a sixth transistor,
the third transistor and the fifth transistor are IO devices, wherein the IO devices use a predetermined voltage to power the PUF cells,
the IO devices are selected to be smaller than a predetermined size defined according to a design rule check (DRC) and generate maximum variations among the plurality of PUF cells; and
a pulse evaluation circuit, programmable to generate a pulse evaluation signal coupled to a control terminal of the second transistor,
wherein after the pulse evaluation signal is stopped, the sense amplifier is enabled to translate difference between a bit line and the complementary bit line.

11. The PUF device of claim 10, further comprising:
a control terminal of the first pair receives a bit signal and an output node of the first pair receives a complementary bit signal,
a control terminal of the second pair receives the complementary bit signal and an output node of the second pair receives the bit signal, and
after evaluating difference between the bit line and the complementary bit line, the sense amplifier generates a latched output result when the bit line and the complementary bit line reaches the stable binary value.

* * * * *